United States Patent
Bardige et al.

(10) Patent No.: US 8,152,529 B2
(45) Date of Patent: *Apr. 10, 2012

(54) COMPUTERIZED SYSTEM AND METHOD FOR VISUALLY BASED EDUCATION

(75) Inventors: Arthur H. Bardige, Cambridge, MA (US); Lukas Biewald, Cambridge, MA (US)

(73) Assignee: Enablearning, Inc, Cambridge, MA (US)

( * ) Notice: Subject to any disclaimer, the term of this patent is extended or adjusted under 35 U.S.C. 154(b) by 809 days.

This patent is subject to a terminal disclaimer.

(21) Appl. No.: 11/099,077

(22) Filed: Apr. 5, 2005

(65) Prior Publication Data

US 2005/0181349 A1     Aug. 18, 2005

Related U.S. Application Data

(63) Continuation of application No. 10/375,905, filed on Feb. 27, 2003, now Pat. No. 6,918,768, which is a continuation of application No. 10/356,399, filed on Jan. 31, 2003, now abandoned.

(51) Int. Cl.
*G09B 23/02* (2006.01)
(52) U.S. Cl. ......... 434/188; 434/191; 434/201; 434/365
(58) Field of Classification Search .................. 434/118, 434/188, 201, 211, 307 R, 308, 322, 323, 434/350, 362, 365, 191; 345/168, 619, 594, 345/650, 661, 676; 382/232, 233; 715/826, 715/700
See application file for complete search history.

(56) References Cited

U.S. PATENT DOCUMENTS

| | | |
|---|---|---|
| 5,584,699 A | 12/1996 | Silver |
| 5,730,602 A | 3/1998 | Gierhart et al. |
| 5,813,865 A | 9/1998 | Greenbowe et al. |

(Continued)

OTHER PUBLICATIONS

Duane C. Hanselman, Bruce r. Littlefield, Mastering MATLAB 5: A Comprehensive Tutorial and Reference, Dec. 23, 1997.*

(Continued)

*Primary Examiner* — Kang Hu
(74) *Attorney, Agent, or Firm* — Houston Eliseeva, LLP

(57) ABSTRACT

A computer-based educational system provides the user or instructor with a suite of graphic editing tools, allowing the design of graphical objects, such as symbols and text that can be displayed to a viewer, such as a student, using a projector or computer terminal. In order to facilitate the educational process, the invention provides the user with robust ability to control parameters of the graphical objects, allowing the user to create simulations or models of subject matter, such as mathematical principles, in order to facilitate the educational process. In the preferred embodiment, the parameters of these graphical objects can actually be defined in terms of variables and specifically functions or expressions including those variables and then the values of the variables controlled in real-time by the user. This ability allows the user to control the execution of the simulations or models, enabling the user or instructor to dovetail the execution of those simulations with the instructional process.

14 Claims, 14 Drawing Sheets

U.S. PATENT DOCUMENTS

| | | | |
|---|---|---|---|
| 5,862,260 A * | 1/1999 | Rhoads | 382/232 |
| 6,091,930 A * | 7/2000 | Mortimer et al. | 434/362 |
| 6,122,403 A * | 9/2000 | Rhoads | 382/233 |
| 6,125,358 A * | 9/2000 | Hubbell et al. | 706/11 |
| 6,173,154 B1 | 1/2001 | Kucinski et al. | |
| 6,362,812 B2 | 3/2002 | Shiraki et al. | |
| 6,400,372 B1 | 6/2002 | Gossweiler et al. | |
| 6,518,988 B1 * | 2/2003 | Aghevli | 715/826 |
| 6,529,705 B1 | 3/2003 | Keller et al. | |
| 6,606,479 B2 * | 8/2003 | Cook et al. | 434/350 |
| 6,652,287 B1 | 11/2003 | Strub et al. | |
| 6,944,596 B1 * | 9/2005 | Gray et al. | 705/1 |
| 7,109,985 B2 * | 9/2006 | Spencer et al. | 345/418 |
| 2003/0134257 A1 | 7/2003 | Morsy et al. | |
| 2003/0134262 A1 | 7/2003 | Fujita | |
| 2004/0014013 A1 * | 1/2004 | Diesel et al. | 434/118 |

OTHER PUBLICATIONS

Rudra Pretap, Getting Started with MATLAB 5, A Quick Introduction for Scientists and Engineers, Sep. 1998.*

Duane C. Hanselman, Bruce r. Littlefield, The Student Edition of Matlab Version 5 User's Guide, Jan. 1997.*

Duane C. Hanselman, Bruce R. Littlefield, Mastering Matlab 5, a comprehensive tutorial and reference, Dec. 23, 1997.*

* cited by examiner

COMPUTERIZED SYSTEM AND METHOD FOR VISUALLY BASED EDUCATION

RELATED APPLICATIONS

This application is a Continuation of U.S. application Ser. No. 10/375,905 filed on Feb. 27, 2003, now U.S. Pat. No. 6,918,768 B2, which is a Continuation of U.S. application Ser. No. 10/356,399 filed on Jan. 31, 2003, now abandoned, both of which are incorporated herein by reference in their entirety.

BACKGROUND OF THE INVENTION

1. Field of the Invention

The present invention relates to computerized systems for creating educational programs and use of such programs. More particularly, it relates to a computerized system and method for authoring and using educational programs which are based upon dynamic images and student interaction with the instructional materials.

2. Discussion of Related Art

The processes of educational instruction have changed little over the course of history. The prototypical process of instruction involves an instructor or teacher, presenting a concepts or processes to the students. Often, a textbook or other form of written material is used by the students to prepare for instruction, to review the concepts, or to gain greater knowledge of a subject. However, these verbal representations require students to mentally translate them in to visual concepts, particularly in the areas of math and science. The vast majority of ideas are dynamic visual concepts. Our minds hold them as moving images: atom, evolution, plate tectonics, black hole, variable, periodic table, mitosis, synapse, electromagnetic field, fractal, jet stream, wave motion, and derivatives. Yet today, they are taught principally with words. Text and talk is the medium of the classroom.

Although technology has increased the use of images, it has done little to change the instructional process. Often, instructors use images that they draw on a blackboard, show using slides or overhead projector transparencies, or reference in a textbook. Such images do not help students comprehend the dynamic nature of many concepts. In many courses, the descriptive lectures are intended to help students try to imagine dynamic images and understand the concepts that they represent. Therefore, a need exists for a system which enables teachers to author and present dynamic concepts visually.

New technologies have been developed using computers to generate images for lectures. In recent years, presentation technologies like Microsoft's.R™. PowerPoint.R™. have been used by instructors in search of a medium for presenting dynamic images to help students picture important concepts. PowerPoint was originally designed for business to create presentation slides. It simplified the process of making presentation slides particularly for non-technical users. However, PowerPoint, as similar presentation software, is limited to the creation of static slides. It does not include the tools necessary to develop or present truly dynamic content visualization required for education.

New technologies have also increased the use of multimedia presentations in education. Multi-media presentations increase the use of dynamic images and may include motion. Technological advances, such as video tape recorders, CD-ROMs and DVD have simplified the use of media in the classroom. However, theses technologies are more difficult and expensive for instructors to use in creating content. Furthermore, such presentations are not interactive. They move at a predetermined pace and cannot be easily adjusted to accommodate different student needs. New animation technologies, like Macromedia's Flash, are also being used to animate the images and even add some interactivity and simulation facility for students. Flash, however, was designed as a professional tool for artists and animators to create business animations that will be used many times. Such animations are difficult to edit or change and very expensive to create. Often, instructors are not sufficiently computer literate to create elaborate dynamic images using known systems. Therefore, a need still exists for a system which allows simple creation and use of visual and interactive images for teaching dynamic concepts.

The growth of global computer networks, such as the Internet, has led to great sources of information. Distance learning has become a desirable option for instruction, which accommodates the time and geographic constraints of instructors and students. However, most Web based instruction is like classroom instruction—textually based—with some multimedia periodically included. Students are again expected to learn visual concepts through internal visualization aided by textual descriptions from instructors. The Web provides a potential medium for dynamic image instruction which has yet to be utilized. While the Web is used to transfer or share textual information or basic images, dynamic systems or concepts are not easily created or used. Existing processes for authoring dynamic images are complex and most teachers lack the sufficient knowledge to use them. Therefore, a need exists for a system which allows instructors to easily author and share dynamic, interactive images. A need exists for a system which also allows instructors to author, edit, and share dynamic images as part of classroom instruction or distance learning.

SUMMARY OF THE INVENTION

The disadvantages of the prior art are substantially overcome by the computer-based instructional system of the present invention providing a suite of authoring, editing and display tools for creating dynamic, interactive images.

The present invention is directed to a computer-based instructional support system. It provides the instructor and the student with a suite of graphic authoring or editing tools which are designed for learning. These tools can be used by teachers to create or present content using a computer/video projector in a classroom or directly to students over the World Wide Web. They can be used by students on individual computers to see, read about, experiment with, or simulate a concept. The invention provides the teacher and the student with a robust ability to create a wide variety of objects on the screen and to control parameters of the graphical objects, allowing the user to create simulations or models of subject matter, such as mathematical principles, to enable learning.

According to one aspect of the invention, the graphical objects are created and manipulated in terms of specific parameters. The parameters of these graphical objects can actually be defined in terms of variables and/or functions or expressions including those variables. The values of the variables can be controlled in real-time by the user. This ability allows the user to control the execution of the simulations or models, enabling the user or instructor to dovetail the execution of those simulations with the instructional process.

In general, according to one aspect, the invention features a computer-based educational that enables the generation of graphical objects. Parameters of these graphical objects are defined in terms of variables and/or expression including the variables. Inputs of values for the variables are then received and the graphical objects updated in response to these values. In this way, the system provides a general-purpose simulation or modeling system that a user, such as an instructor, can utilize in the educational process of viewers, such as students for example.

According to another aspect of the invention, a graphical object editor allows drag and drop generation of graphical objects. Parameters of the graphical objects are modified by selecting and manipulating specified handles associated with the graphical objects. Interestingly, however, parameters of the graphical objects are also definable in terms of the mathematical expressions. As a result, this system can be used to demonstrate abstract concepts associated with math.

In one aspect of the invention, the system may be implemented as an applet that is invoked through a browser. The system may be accessed or used over a global network.

According to another aspect of the invention, the graphical objects include coordinate systems on which functions are plotted. These functions can be then dynamically updated.

In the preferred embodiment, a graphical variable controller is provided to which the variables are associated. This enables the user to then assign values to the variables by control of the graphical controller and step through a series of values for those variables.

In general, according to another aspect, the invention also features a computer-based instructional method. It includes constructing graphical objects to illustrate principles by defining parameters of the graphical objects in terms of variables and/or expressions including the variables. The graphical objects are then displayed to viewers or students while inputting values for the variables. The graphical objects are then updated in response to the values to thereby demonstrate the principles.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The present invention is a computer based system. As such, it consists of a set of computer instructions, stored as a program in a computer memory and executable on a computer processor. They system can be implemented on any type of computer, including a personal computer, mainframe computer, laptop computer, or other computing device. In a preferred embodiment, the invention is implemented on a computer network comprising a server computer and a client computer, operable in known manners. The program and data are stored on the server computer. The program operates on the client system to provide the functionality of the system and the displayed images as discussed below. According to an embodiment of the invention, the system is implemented on a server computer connected to global network, such as the Internet. A client computer, having a browser program can access the educational system program of the present invention on the server computer for execution at a remote location. Furthermore, the program implementing the system of the present invention may be created in any known language, such as C, C++ or Java. Those of ordinary skill in the art of computer programming will readily understand how to create a program having the functionality of the present invention as discussed below.

Figure 1:
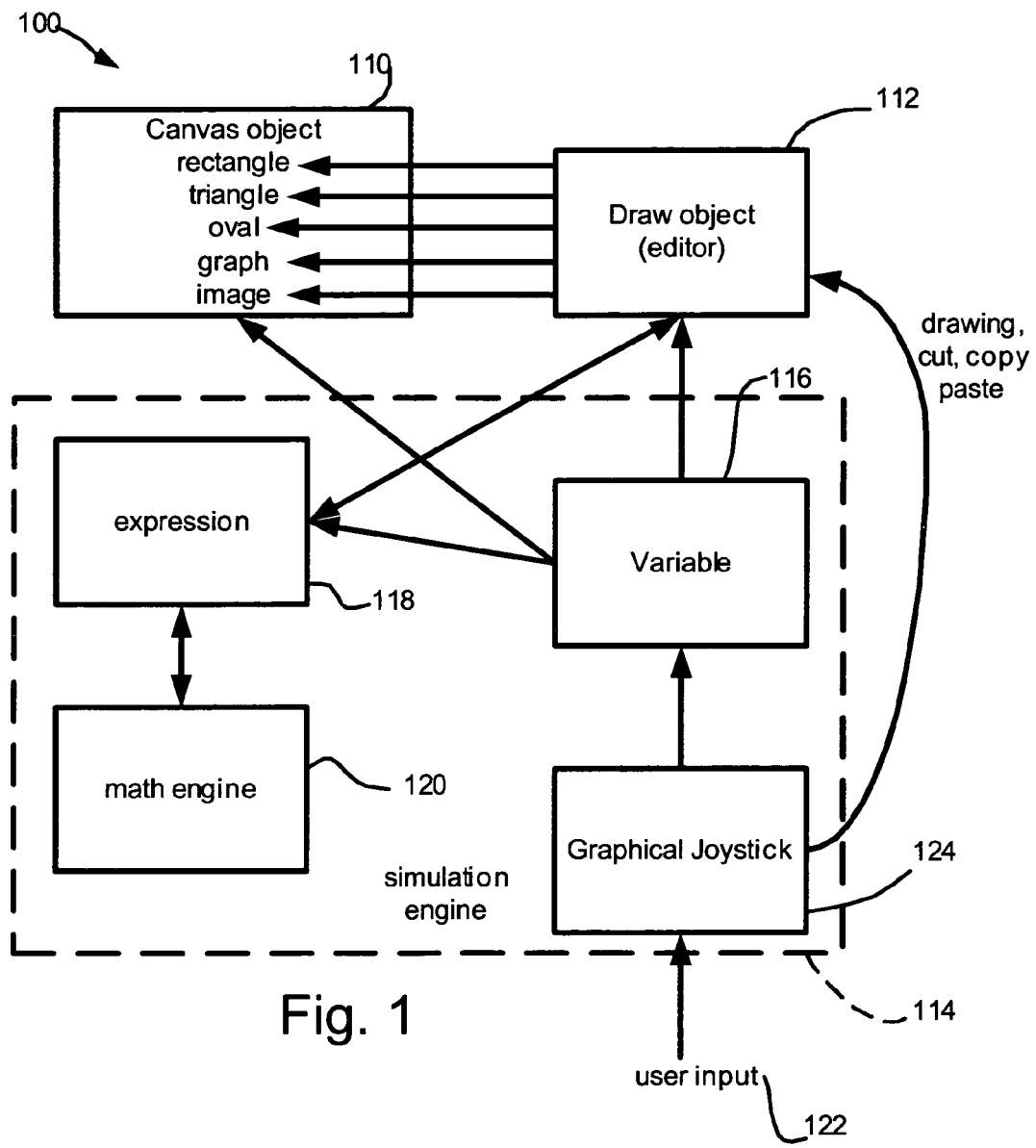
FIG. 1 is a block diagram of the computer-based educational system according to an embodiment of the present invention.

FIG. 1 is a block diagram of an embodiment of a computer-based educational system 100 implementing the present invention. Preferably, the educational system 100 is constructed as a Java-based applet using an object-oriented architecture. The applet includes all of the programming necessary to provide the features and functionality set forth below. In a preferred embodiment, the Java-based applet is stored in a server computer. The applet is accessed by a browser from a client computer. The applet is then transferred to the client computer where it is executed to provide the processes of the present invention. Of course, the system could be constructed in any programming language and stored directly at the client computer or in a computer not associated with a network.

The system includes a canvas object 110, a draw object 112, and a simulation engine 114. The canvas object 110 provides a basic user interface window. The user interface window is displayed on a monitor or other display device (not shown) of the computer system processing the program of the present invention. The canvas object 110 provides a background on which graphical objects created by the computer system of the present invention are positioned. FIG. 2, discussed below, illustrates an embodiment of a user interface generated by the canvas object 110. Specifically, the background 210 is defined by a two dimensional Cartesian coordinate system providing position control of graphical objects based on X and Y axis positions.

Graphical objects used in the system of the present invention are created by the draw object 112 and transferred to the canvas object 110. The canvas object 110 displays each of the graphical objects provided by the draw object 112. The graphical objects may have various types, such as basic shapes, graphs, or image information, as illustrated in FIG. 1.

Multiple graphical objects may be displayed simultaneously or sequentially on the computer display by the canvas object 110. The system includes a memory (not shown) for storing and retrieving graphic objects for display in the canvas object 10. The graphic objects provide the dynamic, visual presentation of concepts within the present invention. The graphic object may also include or be associated with displayed text, audio, or multi-media images for presenting information useful to the student in understanding and operating the system and the concepts taught by the associated graphic objects.

The draw object 112 functions as a graphical object editor. It enables the creation and location of graphical objects on the coordinate system of the user interface created by the canvas object 110. A graphical object includes a type, such as rectangle, triangle, oval, image, and graph, and a series of parameters associated with that type. Of course, other types may be used for the graphical objects. The types provide robust capabilities of the system which are easily selectable by an instructor. A user interface is used to select an object type, appropriate parameters and variables for display of the graphic object. The draw object 112 provides the functionality to create the graphic object based upon the inputs from the user. Parameters associated with the graphic object control the size, location, color, and graphical characteristics of each graphical object.

A simulation engine 114 is used to generate appropriate parameters for the graphic objects. The parameters may be defined, according to user control, in terms of variables 116 and expressions 118 received from the simulation engine 114. The simulation engine 114 allows user modification of the variables 114 and expressions 118 thereby providing the ability to animate the graphical objects instantiated by the draw object 112. This is accomplished through the control of, or assignment of values to, the variables 116, and expressions 118 incorporating those variables. A math engine 120 is provided to interpret the mathematical expressions 118. The embodiment below is described in terms of graphic objects used to instruction and learning of mathematical concepts. Of course, other types of engines may be provided to allow for various types of graphic objects in other subject areas. Different types of user interfaces may be used to allow for inputting information to the simulation engine 114. FIG. 1 illustrates a user input 122 as modifying a graphical joystick 124 displayed by the computer system of the invention. The graphical joystick 124 is used to select and modify variables 116 and expressions 118 within the simulation engine. Thus, in an implementation of the invention, an on-screen control mechanism allows the user to first select a variable to be controlled and then assign specific values to the variable or change the values stepwise.

The ability of the system 100 to function as an dynamic, interactive educational platform is based on the graphical object creation and the ability to control parameters of those graphical objects via the variables 116 and expressions 118. The simulation engine 114 may have different forms based upon the type of user. For example, it may include functionality for an instructor to create new graphic objects or to modify the variables 116 or expressions 118. The instructor may also be able to reorder graphic objects or change the simultaneous or sequential nature of their display. On the other hand, a student may be limited to modification of the values of the variables 116 or of only some of the variables 116 of a specific graphic object. The system of the present invention can be used by an instructor in a classroom to illustrate concepts. In such a setting, the instructor may change the values of variables or the variables themselves to illustrate dynamic operation of the concept. Alternatively, students may be provided access to a previously created set of graphic objects for individual manipulation and learning.

FIGS. 2-7 illustrate the creation and modification of different types of graphic objects according to an embodiment of the present invention. In this embodiment, a specific graphic user interface is used for accessing the functionality of the system. Although a graphic user interface is illustrated, the present invention is not limited to this interface or to any particular interface. Key features of the present invention require a system which allows creation and display of graphic objects including expressions or variables which can be changed for instruction of dynamic concepts.

Figure 2A:
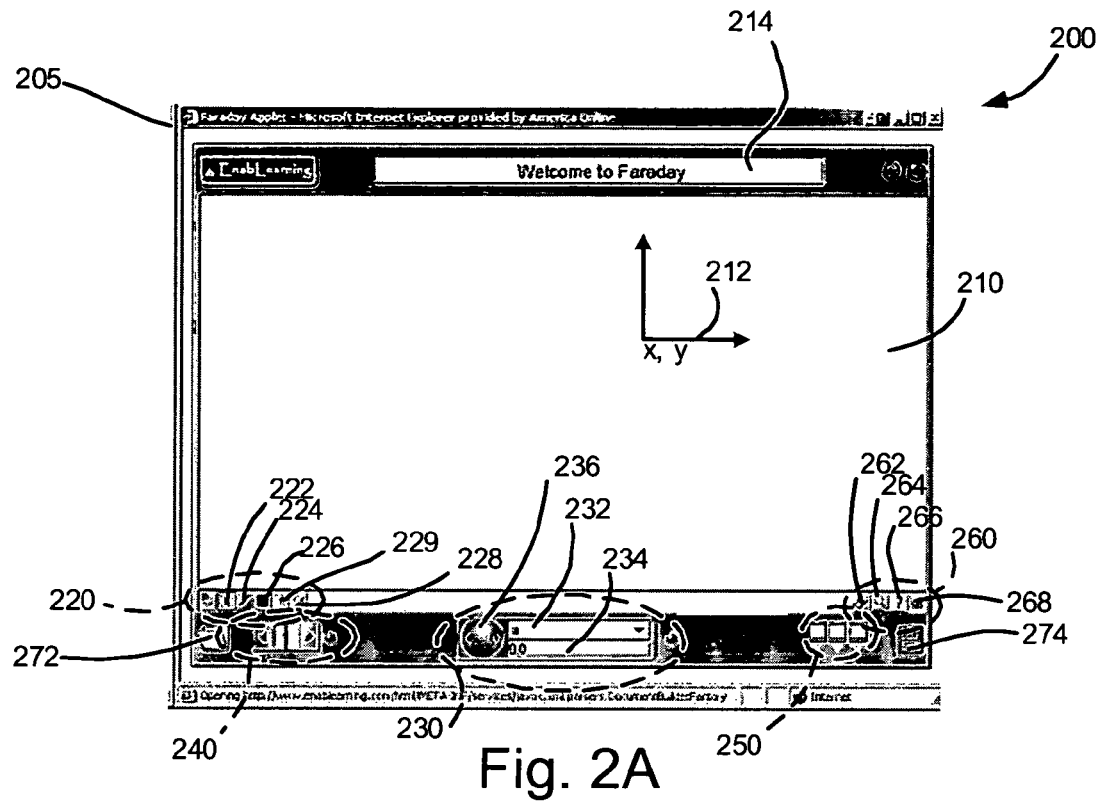
FIGS. 2A-2D illustrate an exemplary interface for the educational system showing the creation and editing of basic graphical objects on the interface.

FIG. 2A (and the following figures) illustrates an exemplary configuration for a user interface 200 of the computer-based educational system 100. A system window 205 includes a title pane 214 providing a title for the session. It comprises a background or canvas 210. The positions on the canvas are defined according to a coordinate system 212.

The bottom part of the window 205 provides a series of graphical controls for the system 100. These graphical controls function as the graphic joystick 124 of the simulation engine 114 of the system 100. The graphical controls, in this embodiment, can be generally categorized as authoring controls 220, graphical variable controls 230, paging controls 240, panel controls 250, and miscellaneous controls 260. Also provided are a save control 272 and a link for the instantiation of an onscreen calculator 274.

In more detail, the editing controls 220 include a select mode control 222, a shapes button 224, a colors button 226, a text button 229, and a top/bottom button 228. The editing controls 220 are used to create and edit objects. These controls are used by an instructor in creating the graphic object necessary for teaching a concept. For a student, the editing controls may be omitted or deactivated to prevent unintentional or unauthorized modification of the graphic objects.

The select mode control 222 converts the mouse-controlled cursor to an arrow allowing the selection of graphical objects on the canvas 210 or control of the variable controller 230, for example. It is used, in one situation, to escape from the creation of a new graphical object. The shapes button 224 is the entry point to the creation or instantiation of graphical objects. Selection of this button provides the user with a listing of types of graphical objects from a system library. The user can select one of the types to create a new object with that type. The colors button 226 allows the user to select among the color pallet to control the color of the generated graphical objects. The text button 229 provides the user with text tools to control a font and size of any generated text. Finally, a top/bottom button 228 allows the user to control the precedence of the graphical objects in their display on the canvas 210. Specifically, graphical objects can be displayed either under or over other graphical objects and thus, may be hidden or hide other graphical objects.

The variable control section 230 is used for controlling the value of the variables 116 used in a graphic object. It has three main parts, a variable selection text window button 232, a variable value text window button 234 and a graphical joystick 236. The variable selection text window button 232 allows the user to select a variable associated with a graphic object from a pull-down menu. The value of the selected variable may then be modify using the other controls of the variable control section. The pull-down menu may include all of the variables associated with a specific graphic object, all variables associated with all currently displayed graphic objects, or a subset of variables which are identified as being controllable by the user. The modifiable variables in the pull-down menu may be different during creation and editing of the graphic object and later use by students. The variable value text window button 234 shows the value for the variable currently displayed on the variable selection button 232. The value can be changed by inputting a new value in the variable value text window 234. Finally, the graphical joystick 236 allows the user, by graphically selecting either one of the two illustrated arrows, to increase or decrease the assigned value to the variable shown in the variable selection button 232 by an assigned step value.

The page control section 240 includes left and right arrow buttons allowing the user to move through a series of pages. This allows the user to create multi-page presentations including a series of separate simulations or models for each page. The pages may be stepped through during lesson progression.

The panel control section 250 enables the user to step through or control the display of multiple panels for each page. In more detail, each page optionally includes a series of panels that are either alternatively or simultaneously displayed on the canvas 210. This provides a capability to investigate variants of the current model in the various panels before stepping through to a new simulation on a next page. According to an embodiment of the invention, up to three panels can be associated with and displayed on each page.

The miscellaneous buttons 260 provide additional control to the user. Specifically, an erase button 262 allows the user to erase graphical objects from the canvas 210. A zoom button 264 allows the user to zoom in or zoom out, dynamically controlling the extent of the displayed canvas 210 in terms of the coordinate system 212. The help button 266 is provided as a link into the system's help facility. Finally, a canvas-settings button 268 allows the user to control various settings of the canvas 210.

In the present embodiment, a number of other buttons are provided. Specifically, a save button 272 allows the user to save the simulations produced by the system. They are saved locally on the client or published to a web site to promote collaboration and shared content across a community of users. Further, a calculator window control 274 is provided. This provides an on-screen calculator to perform mathematical calculations.

The present invention is not limited to the user interface 200 illustrated in FIG. 2A or to the specific controls included therein. Other user interfaces or controls could be provided to provide the operations necessary to create, edit, and display objects in the system of the present invention. Various controls may be combined or other controls added to increase or decrease the functionality of the system. Some of the editing or authoring features of the system 100 are illustrated with respect to FIGS. 2-7.

Figure 2B:
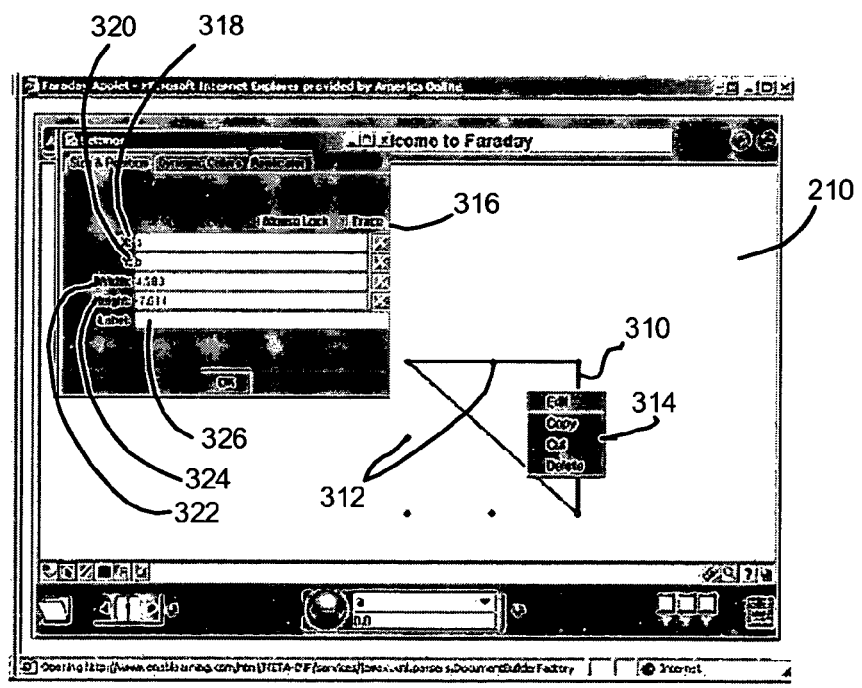

FIG. 2B shows process for the establishment of parameters for a basic graphical object 310. Specifically, the shapes button 224 is used to select an graphical object 310 for placement on the canvas 210. As illustrated in FIG. 2B, the graphical object may be a basic shape, such as a triangle. A variety of controls are associated with each graphic object in the system library. These controls operate as parameters of the system. For example, the graphical object 310 may have a series of handles 312 which can be selected by the user, through control of the mouse, to change the size and location of the graphical object 310. Other controls may be selectively displayed. According to an embodiment of the invention, right-click selection on the graphical object 310 invokes an edit, copy, cut, delete menu 314. Selection of the edit function from the menu results in display of an object settings window 316.

The object settings window 316 provides control over the basic parameters of the graphical object 310. For the graphical object illustrated in FIG. 2B, the parameters include the X position 318, the Y position 320, the object's width 322, the object's height 324, and a label 326, which can be added to the object. These parameters are based on the coordinate system 212 of the canvas 210. The specific parameters depend upon the type of graphical object as selected from the system library.

The parameters of the object are either defined in terms of constants, variables, or expressions including variables. Specifically, the width 322 and the height 324 in the illustrated example have specific constant settings. These are changed by the manipulation of the graphical object's handles 312 or by direct entry of the desire value, and cannot be changed during the use mode. The X position is defined in terms of the "a" variable and the "Y" position is defined in terms of the "b" variable. Alternatively, instead of a simple variable, an expression such as "a+b" or "a.sup.2" could be used to control the X and Y locations. This variable control is the basic modality by which the user constructs the simulations. Any of the parameters may be set to constants, variables or expressions during creation or editing.

Figure 2C:
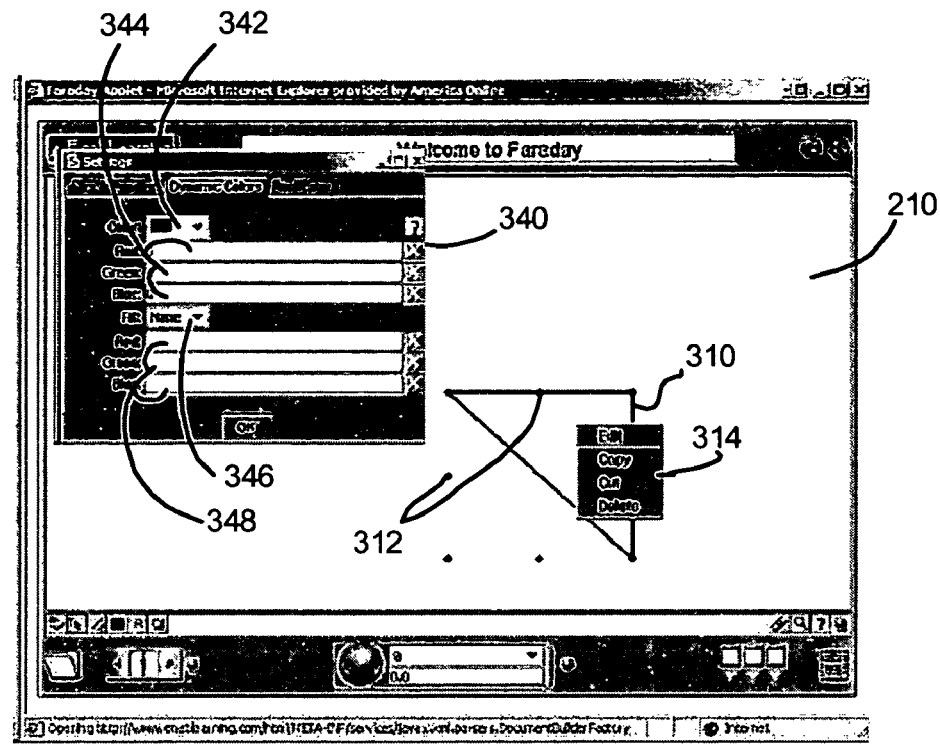

As shown FIG. 2C, additional parameters may include control over the color of the graphical object 310 through selection of the dynamic colors tab window 340. Here, parameters include the line color 342 and the fill color 346. The parameters are controlled by entering the level for each of the primary colors in data entry areas 342 for the line color and areas 348 for the fill color. As with the shape and position parameters, color levels may be entered as constants, variables, or expressions. Entry of a constant yields static colors. In contrast, entry of variables and/or expressions enables user control of the colors as part of a simulation.

Figure 2D:
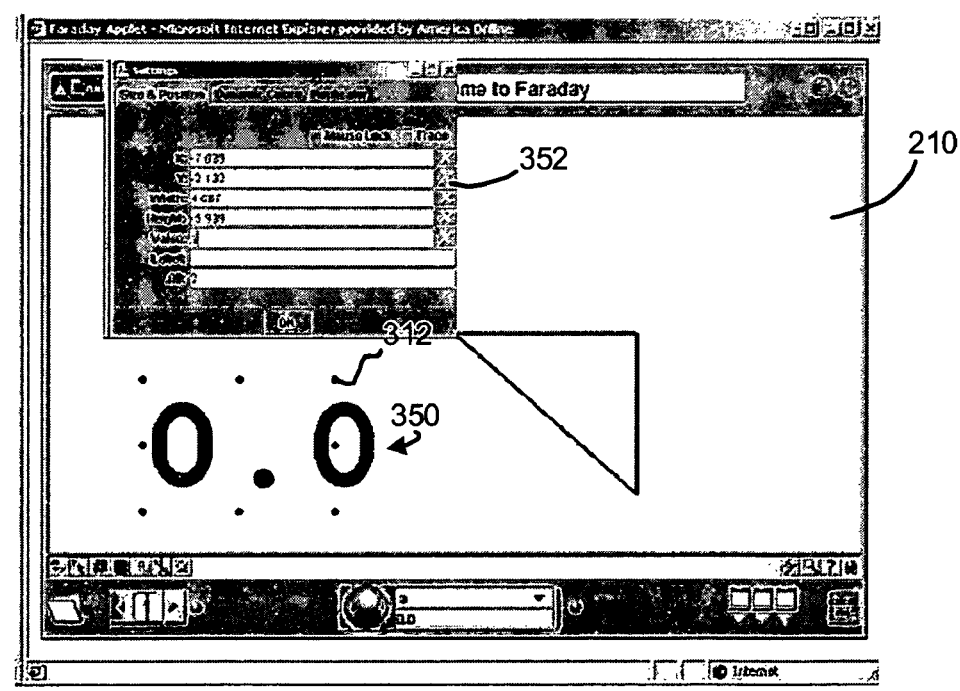

Further, as illustrated in FIG. 2D, additional graphical objects 350 may be added to the same canvas 210. In the illustrated example, a number graphical object 350 is added to the canvas 210 with the triangle object 310. It has its own handles 312, allowing the control of its size and position. This number graphical object 350 has its own object settings window 352, which provides the ability to control its content, X, Y position, width, and height parameters. In the illustrated example, the value of the content is set to be the variable "a".

Thus, in the illustrated example, the positions and colors of graphical objects are defined in terms of constants, variables and/or expressions including variables. The values of the variables or expressions may be displayed on the canvas 210 using the number graphical object 350.

Figure 3:
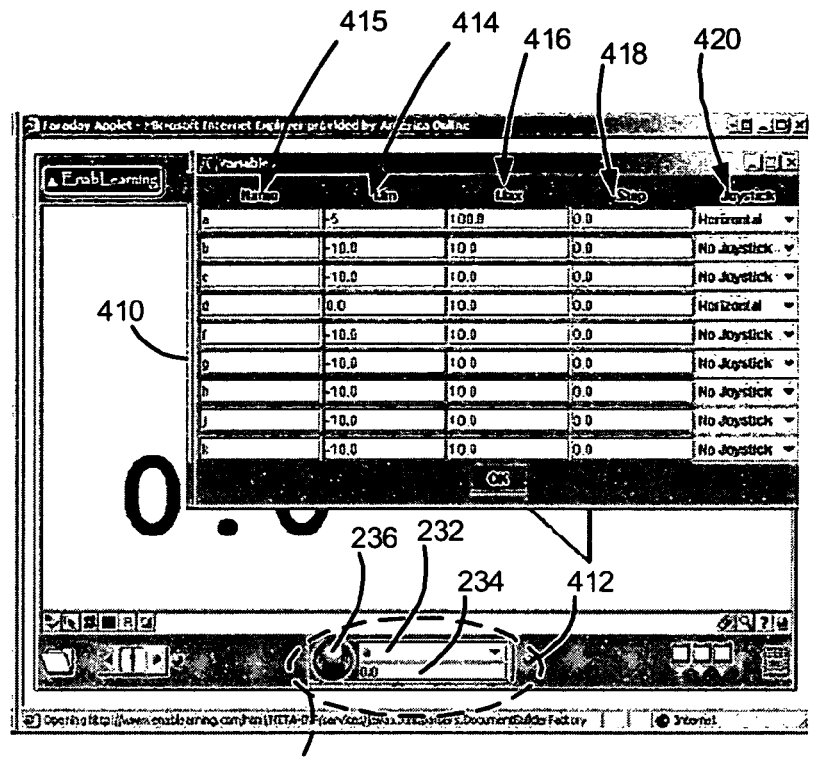
FIG. 3 illustrates the interface for the assignment of variables to the graphical variable controller.

FIG. 3 shows an embodiment of variable creation and control during the creation or editing of graphic objects using the variable graphical controller 230. During the creation or editing mode of the system, selection of a variable names button 412 invokes a variables window 410. The variables window 410 provides a list of variables, illustrated as "a" through "k". The user may create names for the variables by modifying the data entry areas in column 415, to provide simulation-specific variable names, which will be later selected by the student.

The variables window further enables the user to set minimum and maximum ranges for each of the variables, in columns 414 and 416, respectively, and individual step sizes, in column 418. The selected step size corresponds to how much a selected variable's value will change with the control of the graphical joystick 236 during the lesson mode of the system. A joystick configuration column 220 links the control of the variables value to the graphical joystick 236 and whether the joystick is in a horizontal vertical or horizontal and vertical control mode.

Figure 4A:
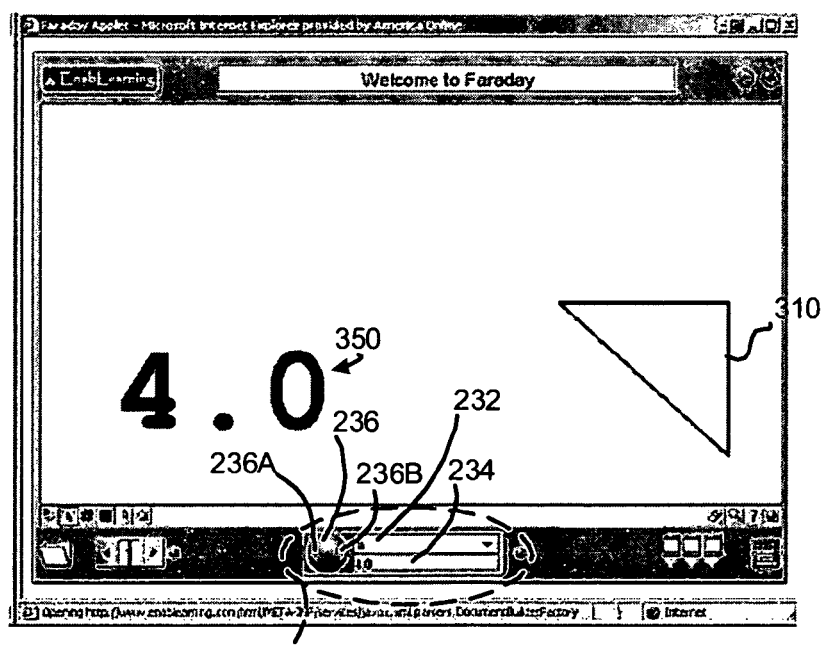
FIGS. 4A-4B show the interface of the system showing how the parameters of the graphical objects can be manipulated or controlled via the graphical variable controller, thus illustrating the basic modality by which simulations and models can be constructed.
Figure 4B:
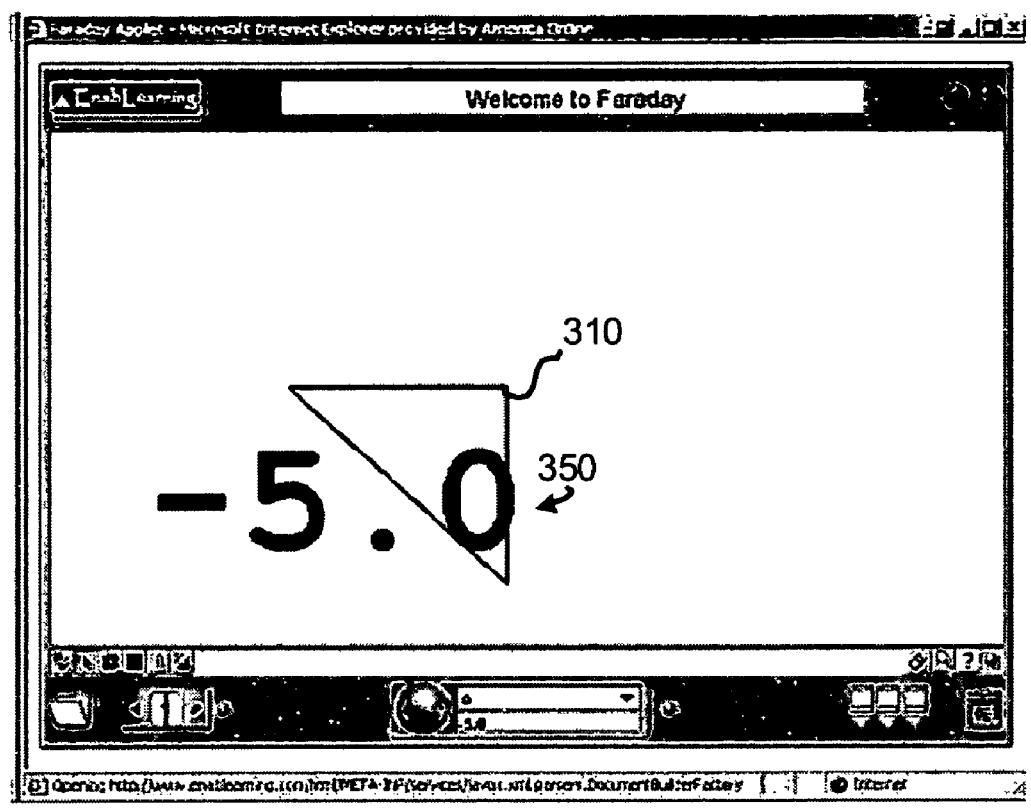

FIGS. 4A-4B show how the graphical objects 310, 350 are controlled via the graphical variable control system 230 and specifically the graphical joystick 236 during lesson mode. Specifically, as illustrated in FIGS. 4A and 4B, selection of the left arrow 236A and the right arrow 236B via the computer mouse allows the increase or decrease to the selected variable in the variable selection button 232, to thereby increase or decrease the value as illustrated in the variable value button 234. In the illustrated example, this value is provided in the illustrated graphical object 350. Thus, changing the value of variable "a" yields an update to the graphical object 350, which displays the value of that variable. It also yields the update of graphical object 310, specifically, with reference to FIG. 2B, the X position of the graphical object 310 was defined in terms of the variable "a", thus, as the variable "a" is increased and decreased as shown in FIGS. 4A and 4B, the graphical object 310 moves across the canvas 210. The effect of selection using the graphical joystick 236 or entry of a value in the variable value text window 234, is controlled by the variable set up as set forth above. On the variables created using the variables window 410 can be modified. These variables are modified by entry of values or used of the graphical joystick 236 as they were set in the variables window, and values are limited to the set range and step size.

FIGS. 5A-5E illustrate selection of types of graphical objects provided in the system library. These graphical objects are selected via the shapes button to thereby invoke the graphical object editor. While certain types of graphical objects are illustrated, any type of object could be created and included in the system library. In order to simplify operation of the system, users are limited to the types of objects in the system library and cannot create other types of objects. Other functionality could be provided to allow creation of types of objects for inclusion in the system library. The system library includes the appropriate parameters which can be set for the type of object and the display characteristics based upon those parameters.

Figure 5A:
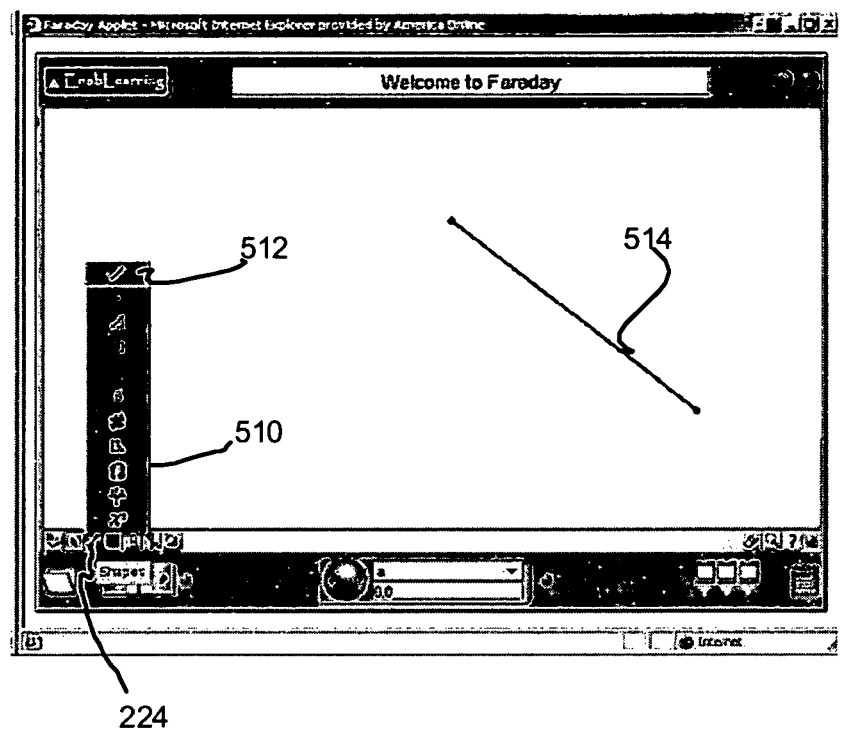
FIGS. 5A-5E illustrate the creation of various graphical objects from the system's library.
Figure 5B:
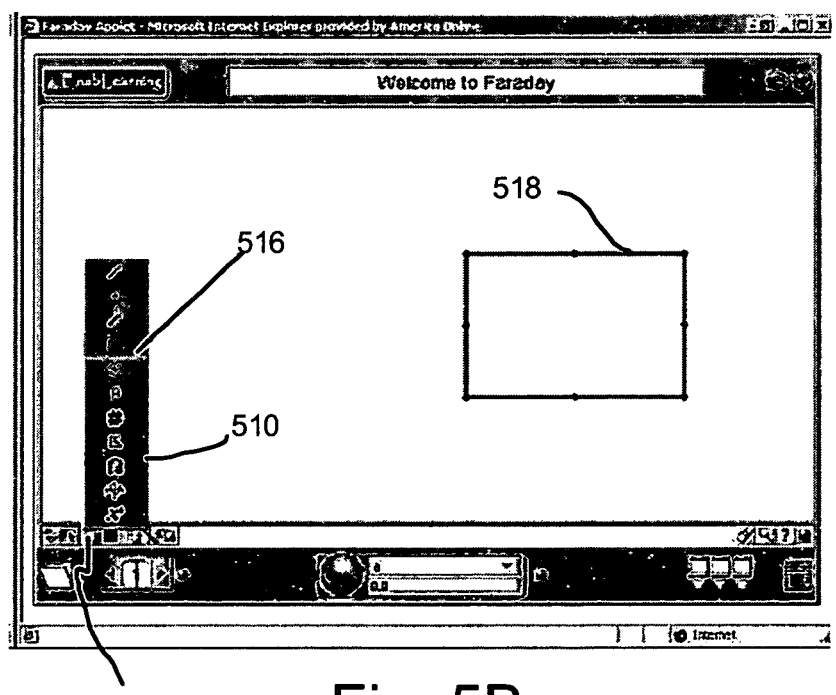
Figure 5C:
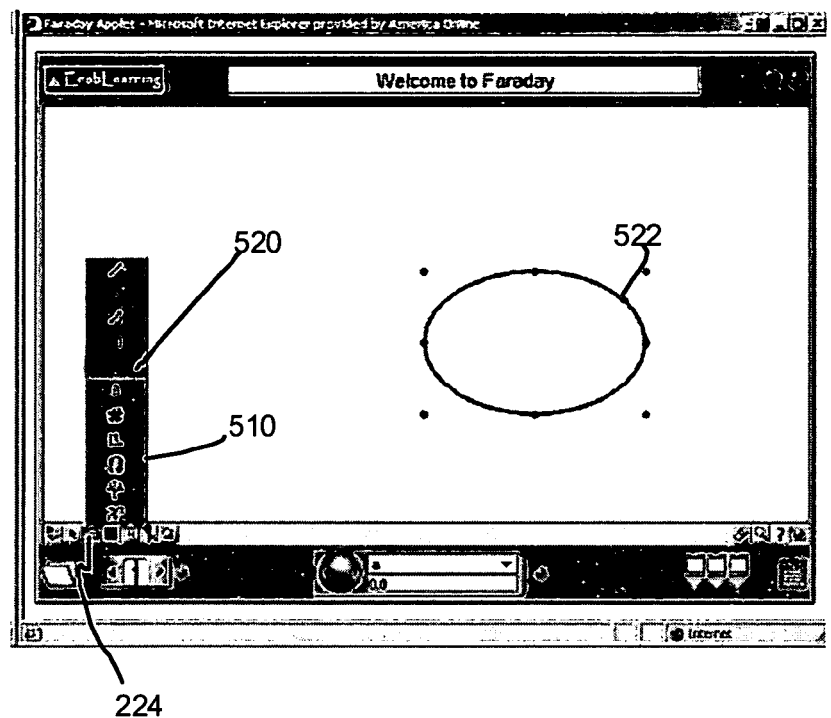

Referring to FIG. 5A, selection of the shapes button 224 invokes a shapes selection menu 510. This illustrates the various shapes in the graphical object library. Specifically, selection of the line shapes 512 produces a line graphical object 514. As illustrated in FIG. 5B, selection of the rectangle button 516 from the menu 510 produces a rectangle graphical object 518. FIG. 5C shows the selection of the oval graphical object 520 from the menu 510. This produces an oval graphical object 522.

Figure 5D:
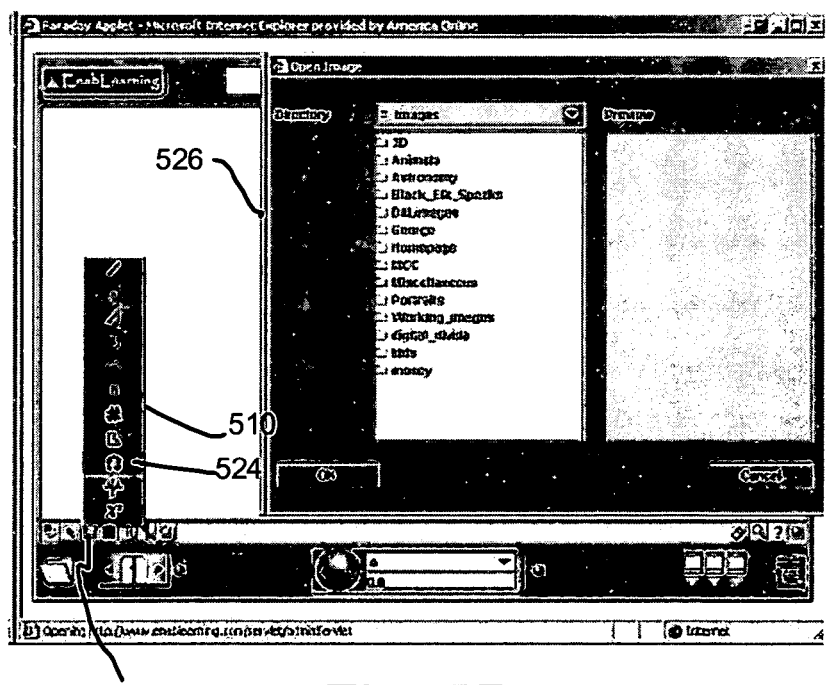

Additionally, as illustrated in FIG. 5D, generic graphical objects can also be inserted onto the canvas 210. Specifically, selection of the images button 524 from the menu 510 provides an open image-browsing window 526. This allows the user to browse among various content provided by the system or stored elsewhere on the computer for insertion onto the canvas 210.

Figure 5E:
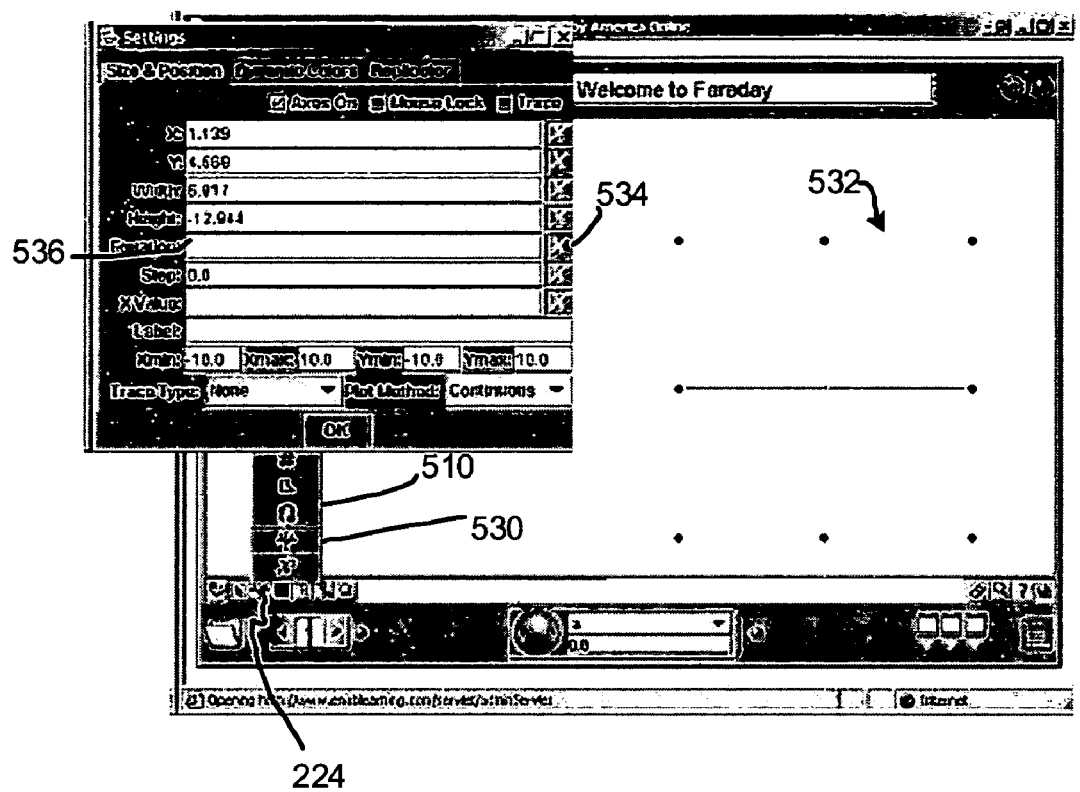

Finally, selection of the graphing button 530 from the menu 510 yields a graph graphical object 532 as illustrated in FIG. 5E. The parameters of the graphical object 532 are set via a graph settings window 534. Here, again the position and length and width of the graph graphical object 532 are set. It further has a setting for the inclusion of an equation in data entry location 536.

FIGS. 6A through 6F illustrate an application for the graph graphical object 532. Specifically, in the illustrated example, the graph graphical object 532 in its settings window 534 includes an expression, which is a cubic equation, in the example, or other equation entered by the user, in which the multipliers for each of the terms are variables "a" through "d".

Figure 6A:
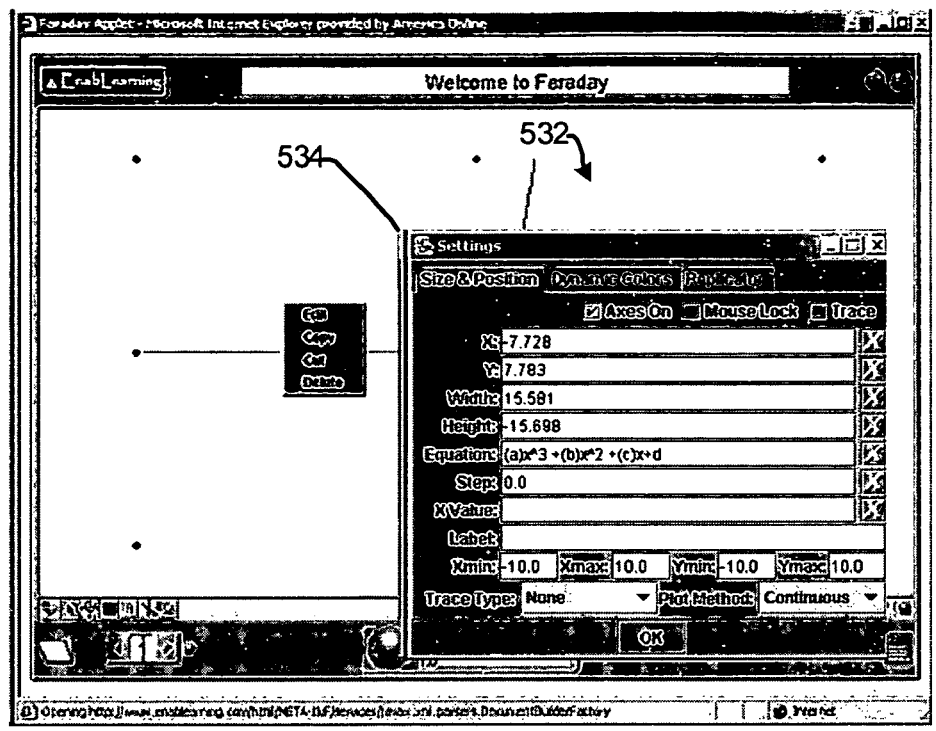
FIGS. 6A-6F illustrate the construction of a graphical object and its application in the context of illustrating the behavior of an equation.
Figure 6B:
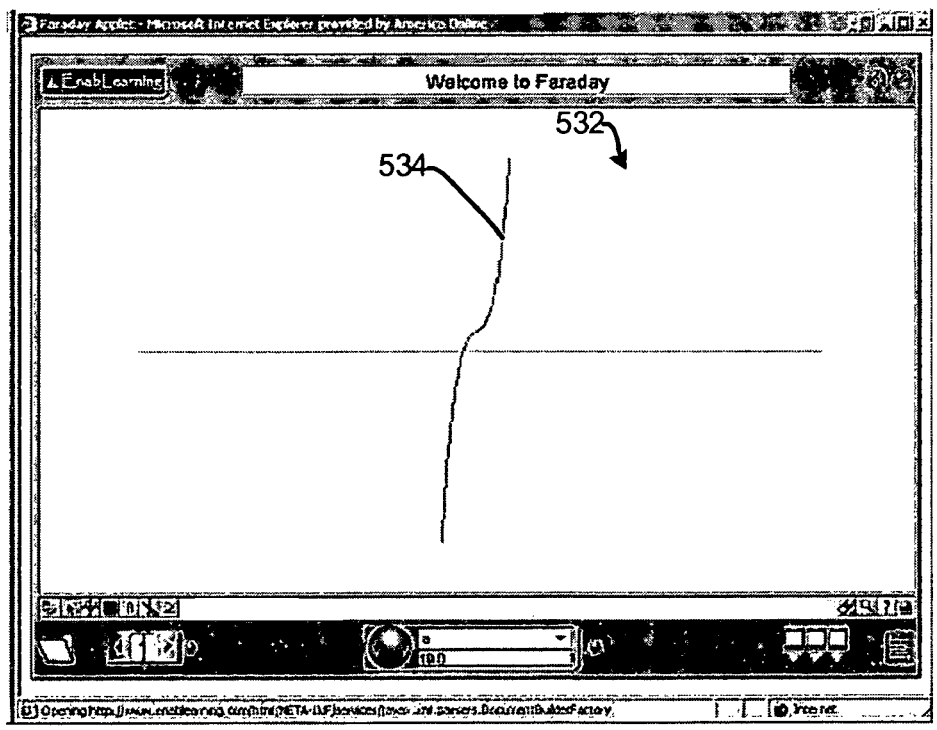
Figure 6C:
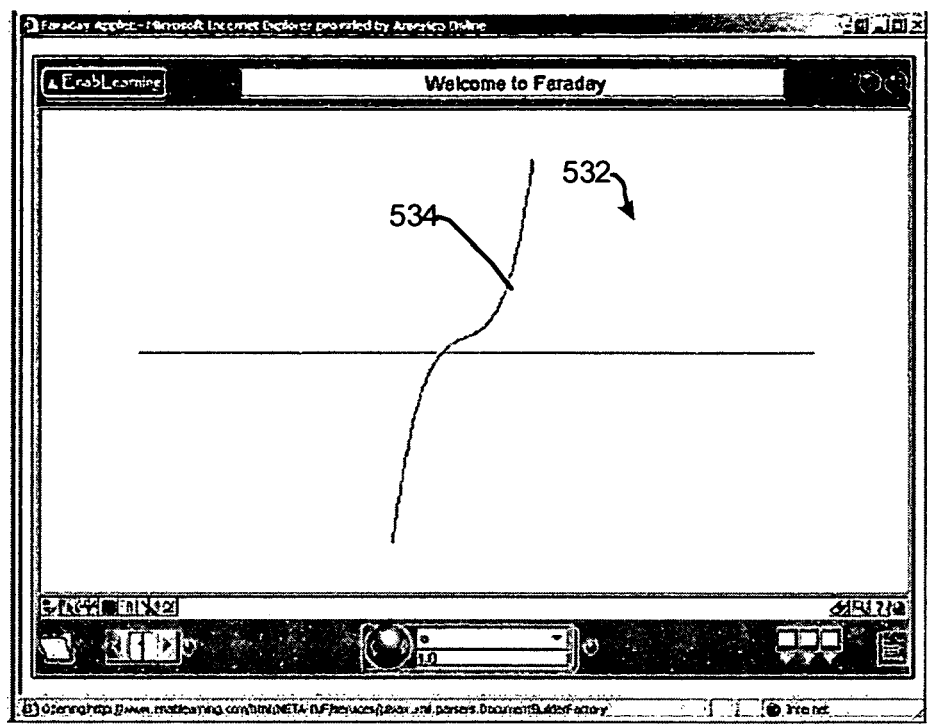

As illustrated in FIGS. 6B and 6C, the student can then be shown how the function changes with changes to each of the variables.

Figure 6D:
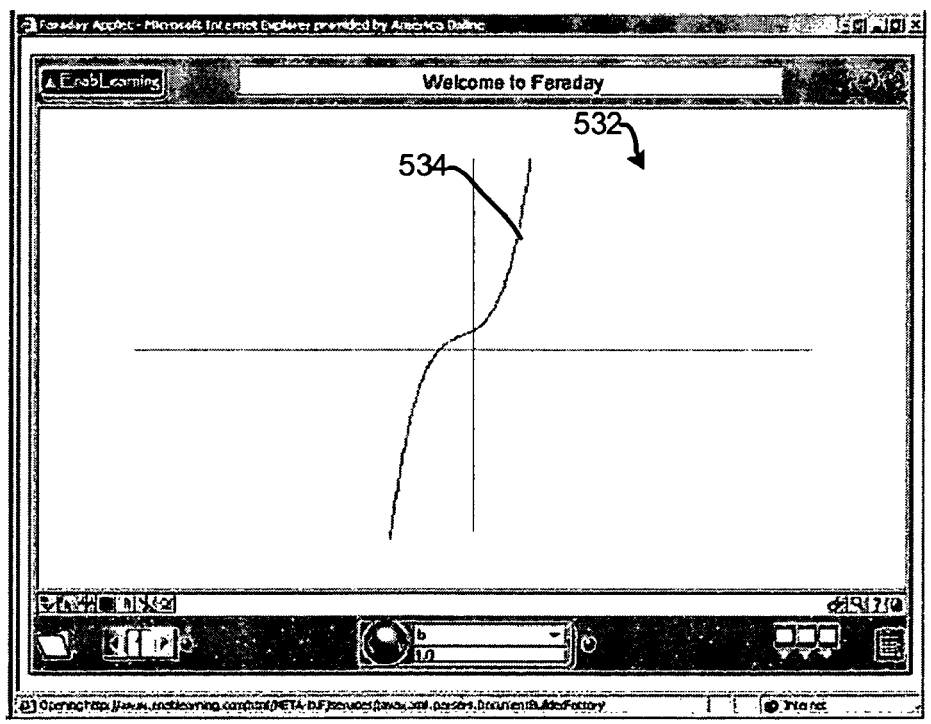
Figure 6E:
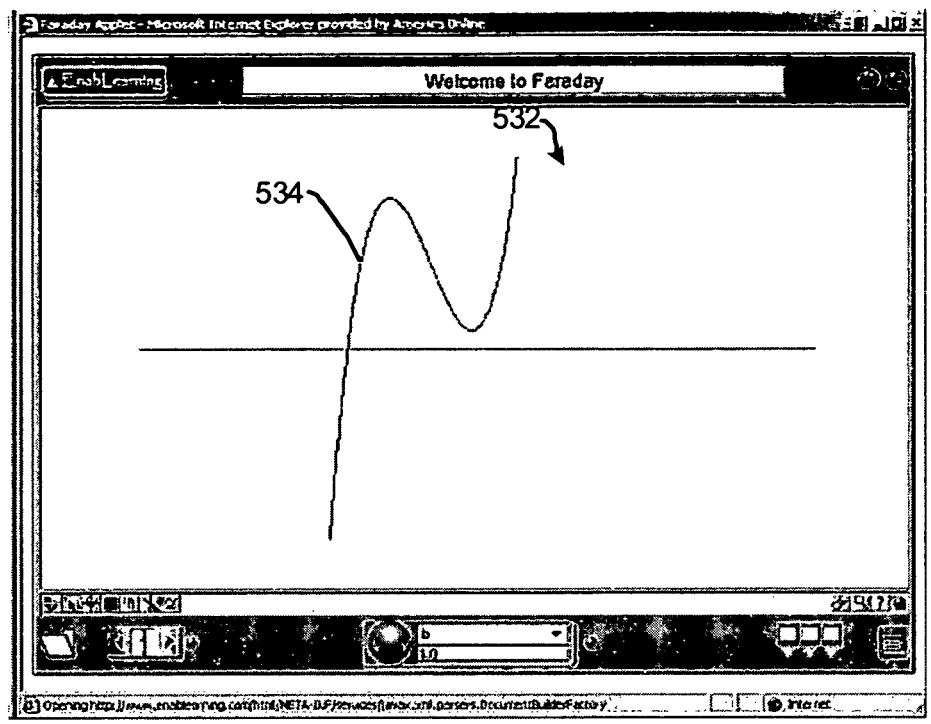
Figure 6F:
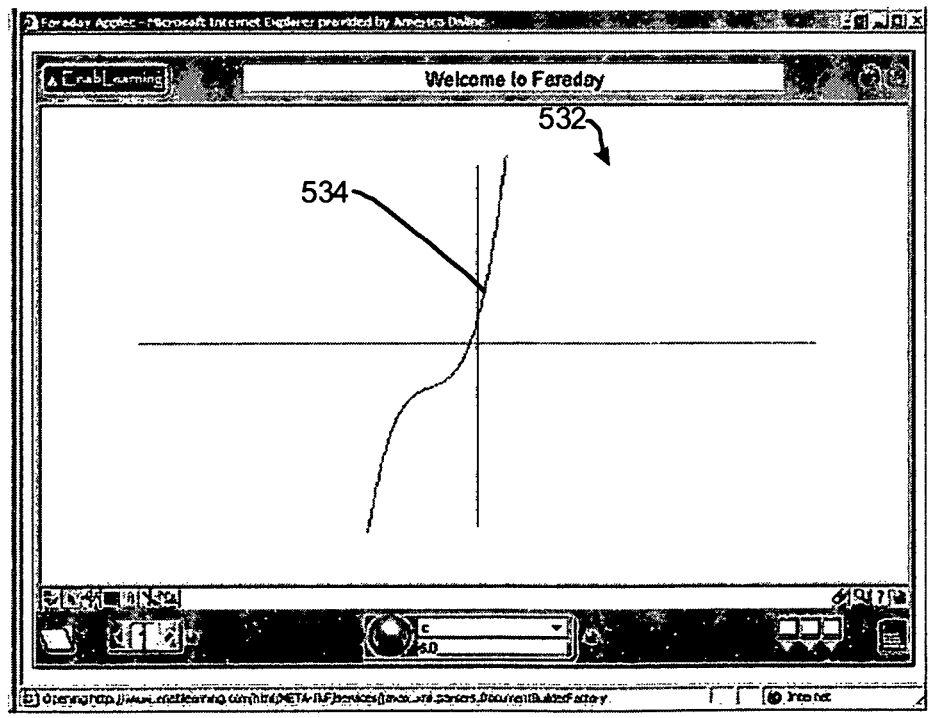

Specifically, as illustrated in FIGS. 6B and 6C, changing the "a" variable between 10 and 1 for the $x^3$ parameter using the graphical joystick shows the changes to the graphed function 534 in the graphical object 532. In a similar vein, FIGS. 6D and 6E illustrate how changes to the "b" variable of the $x^2$ parameter change the graphed function 534. Finally, FIG. 6F illustrates control of the "c" variable and resulting changes in the function 534

Figure 7A:
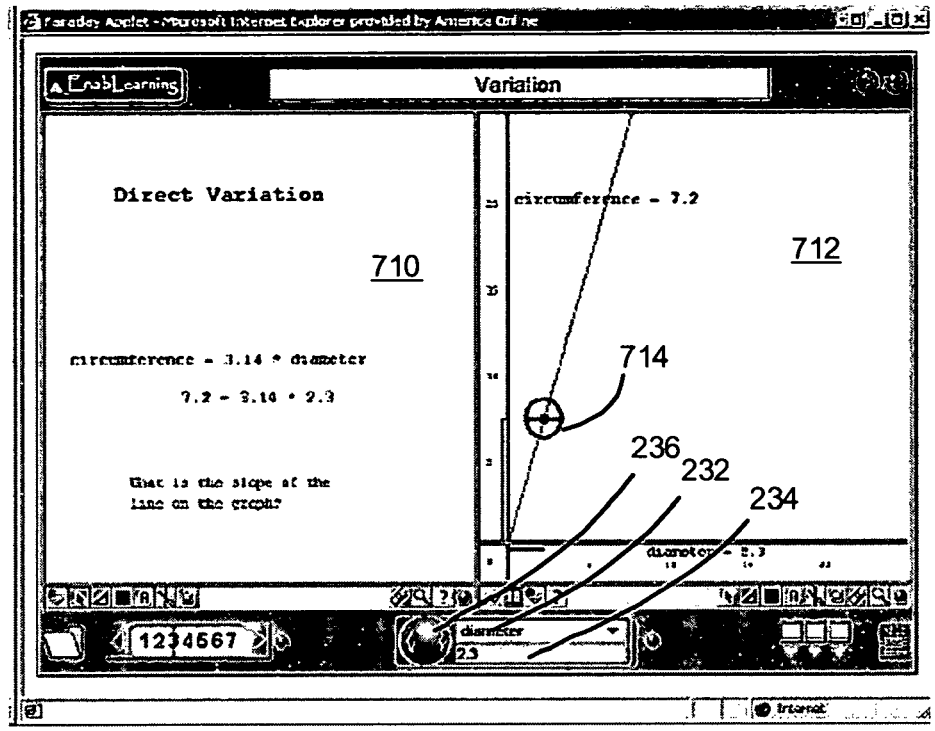
FIGS. 7A-7D show the interface with specific lessons on direct and inverse variation.

FIGS. 7A-7D illustrate operation of an embodiment of the invention in lesson mode, with exemplary lesson loaded into the system. The exemplary lesson is designed to illustrate the principles of direct and inverse variation. As illustrated in FIG. 7A, the first page of the lesson includes two panes 710, 712. The left pane 710 includes text and numeric graphical objects corresponding to the variable "diameter" and the expression "circumference." The right pane 712, includes a graph graphical object of diameter and circumference and a circle graphical object. The position and diameter of the circle graphical object are determined by the variable "diameter"; the position is also determined, in the Y direction, by the expression "circumference."

Figure 7B:
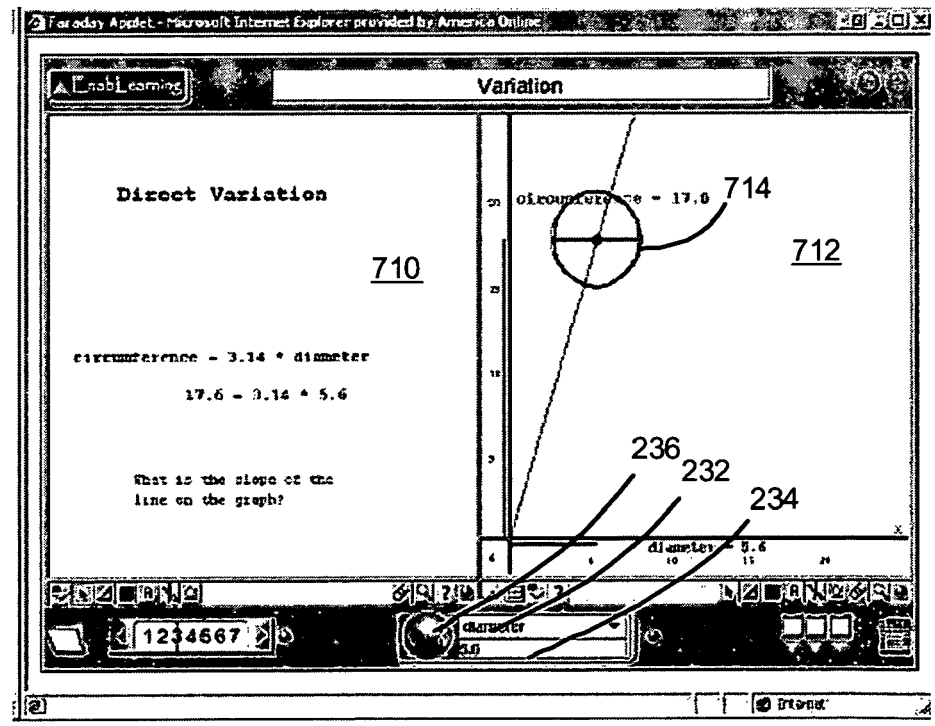

As understood by comparing FIGS. 7A and 7B, control of the graphical joystick 236 results in changes to the value of the "diameter" variable in window 232. This updates the calculation in the left pane 710. It also results in changes to the graphical objects in the right pane 712. Specifically, the plot shows the relationship between the circumference and diameter and also the size of the circle graphical object 714. This lesson illustrates how the circumference varies with the diameter by the amount Pi.

Figure 7C:
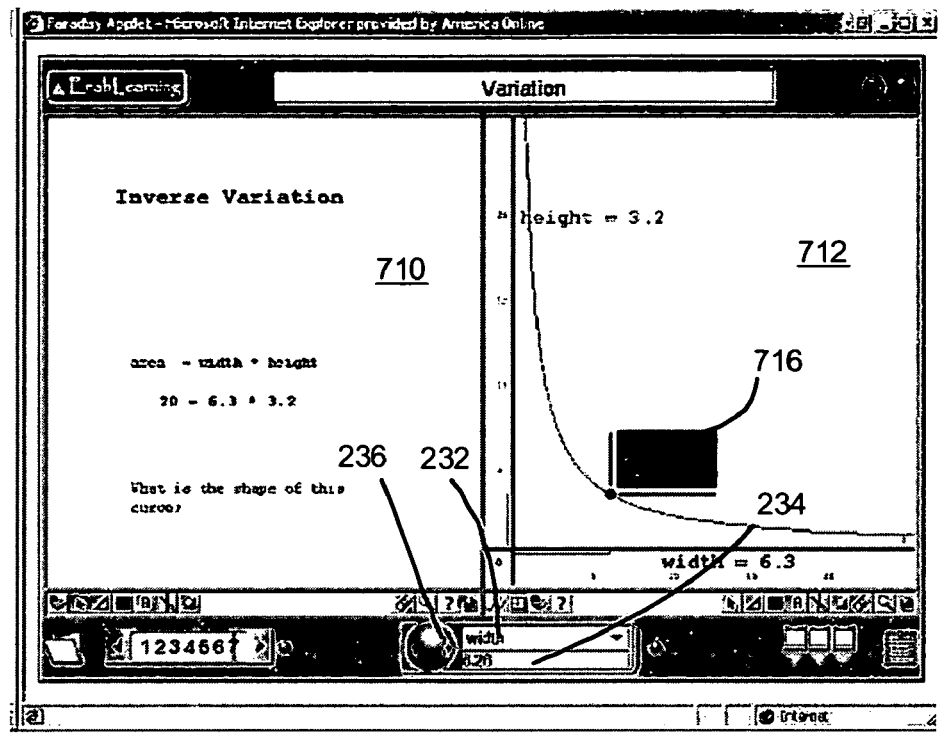
Figure 7D:
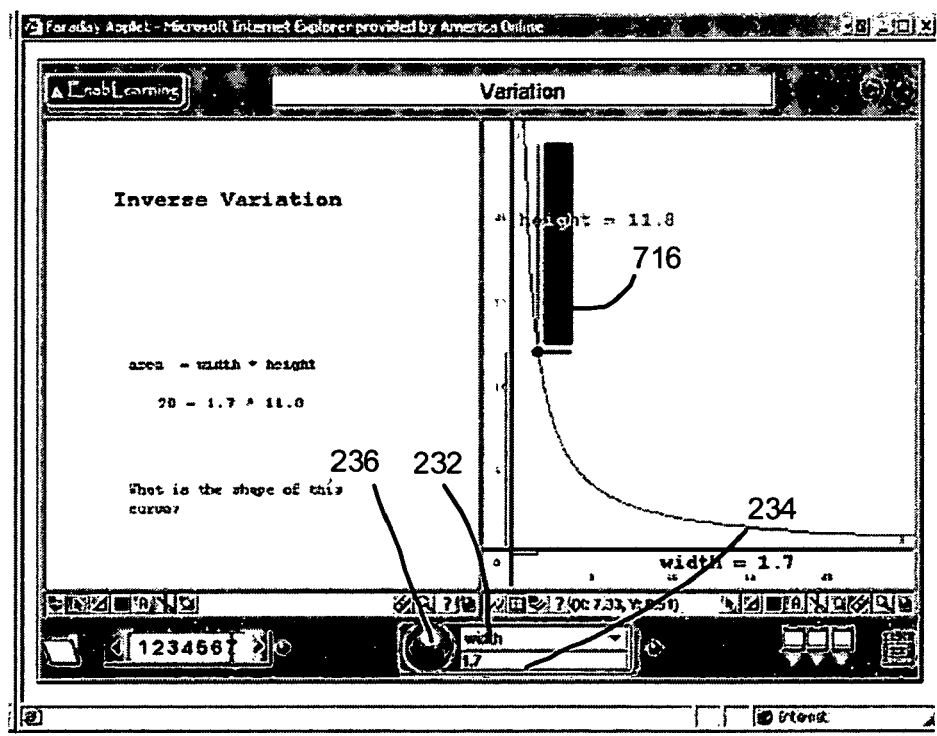

FIGS. 7C and 7D illustrate the second page of the lesson, which also has two panes 710, 712. The second page of the lesson relates to the principle of inverse variation. Here, the left pane 710 illustrates the mathematical relationship between area, width and height. The right pane 712 shows how, for a fixed area, the height and width varying inversely. The right pane 712 again includes a graph graphical object, showing height and width for a constant area, and a rectangle graphical object 716, with a width, height and position based upon variables. The aspect ratio of the rectangular object 716 changes with changes to the width variable, showing the hyperbolic relationship. The user can control the "width" variable using the variable control section 230, including the graphical joystick 236. As the value of the width variable changes, the displayed values on the left pane 710 and the position and aspect ratio of the rectangle on the right pane 720 are altered accordingly.

Figure 8:
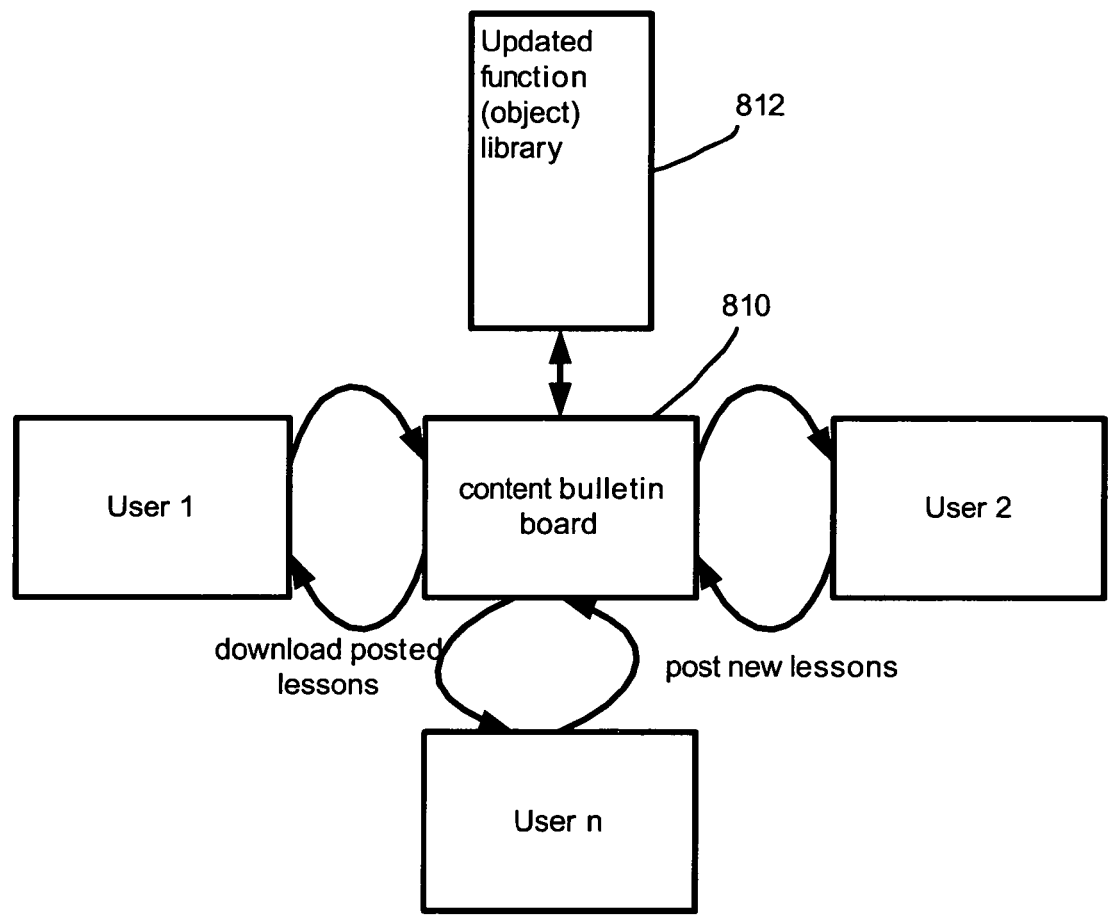
FIG. 8 is a block diagram illustrating how user communities are created using the educational system as a platform for the interchange of template lesson plans for instruction.

FIG. 8 shows how the educational system 100 of the present invention is used as a platform for the exchange of content, such as lesson plans among a users' community, such as a community of teachers. Specifically, lesson plans stored as sharable data files for the educational system 100 are exchanged via a file system over the internet. The save button 272 allows the content author to save lessons locally or to a shared file system. This file system allows lessons to be published to other user via a bulletin board 810. Various users, User 1 . . . User n access that content, update it or modify it, and then save it back to the bulletin board 810. The bulletin board also provides a vehicle by which updated graphical object libraries 812 are provided to the users.

The notion is that the inventive educational system 100 functions as a basic platform for education in the same way as a word processor functions as a basis for interchange of documents. But, the "documents" are dynamic simulations that are used in the educational process by teachers.

While this invention has been particularly shown and described with references to preferred embodiments thereof, it will be understood by those skilled in the art that various changes in form and details may be made therein without departing from the scope of the invention encompassed by the appended claims.

What is claimed is:

1. A computer-based educational system, the system comprising:
a computer and a display device enabling generation of graphical objects by a user, which are displayed on the display device, in which parameters of the graphical objects are defined in terms of variables or expressions, including the variables, wherein the parameters include a size and a position of the graphical objects;
a user input device for providing inputs of values for the variables by the user, and the computer and display device updating the graphical objects in response to the values;
a library of defined graphical objects stored in the computer, which are selected and instantiated by a user to generate the graphical objects, which are displayed; and
a graphical variable controller displayed in the display device and to which the variables are associated, enabling user assignment of values to the variables by manipulating the graphical variable controller using the user input device to increment or decrement the values by a step value.

2. A computer-based educational system as claimed in claim 1, wherein the computer of the system enables other parameters of the graphical objects to be defined in terms of constants.

3. A computer-based educational system as claimed in claim 1, wherein the computer of the system enables the parameters of the graphical objects to be modified generating and displaying handles for the graphical objects and by enabling the user to select and manipulate the handles of the graphical objects using the user input device.

4. A computer-based educational system as claimed in claim 1, wherein the parameters include color of the graphical objects.

5. A computer-based educational system as claimed in claim 1, wherein the system is invoked through a browser running on the computer.

6. A computer-based educational system as claimed in claim 1, wherein the graphical objects include coordinate systems on which functions are plotted.

7. A computer-based instructional method, comprising:
providing a library of defined graphical objects;
using the defined graphical objects when constructing graphical objects, which are displayed on a display device, to illustrate principles for education of students by defining parameters of the graphical objects in terms of variables or expressions, including the variables;
displaying the graphical objects on the display device to students while inputting values for the variables; and
updating the graphical objects displayed on the display device, including a size or position of the graphical objects, in response to the values to thereby demonstrate the principles using a graphical variable controller, which is also displayed on the display device, to which the variables are associated, by manipulating the graphical variable controller using a user input device to increment or decrement the values by a step value.

8. A method as claimed in claim 7, wherein the step of constructing graphical objects further comprises defining parameters of the graphical objects in terms of constants.

9. A method as claimed in claim 7, wherein the step of constructing graphical objects comprises displaying handles for the graphical objects and modifying parameters of the graphical objects by enabling the students to manipulate the handles of the graphical objects.

10. A method as claimed in claim 7, wherein the parameters include colors of the graphical objects.

11. A method as claimed in claim 7, wherein the graphical objects include coordinate systems on which functions are plotted.

12. A method as claimed in claim 7, wherein the step of constructing the graphical objects is performed by an instructor of the students.

13. A method as claimed in claim 7, further comprising displaying in a pane, a mathematical equation being illustrated by the graphical objects.

14. A computer-based educational system as claimed in claim 1, wherein the display comprises a pane displaying a mathematical equation being illustrated by the graphical objects.

* * * * *